United States Patent
Kim et al.

(10) Patent No.: US 10,920,750 B2
(45) Date of Patent: Feb. 16, 2021

(54) MULTI-CLASS CONTROLLER FOR WIND POWER GENERATOR AND WIND POWER GENERATION SYSTEM USING SAME

(71) Applicant: HANJIN IND. CO., LTD., Yangsan-si (KR)

(72) Inventors: Dae Young Kim, Yangsan-si (KR); Sang Hyeon Jeon, Busan (KR); Young Sool Yoon, Yangsan-si (KR); Tae Joong Kang, Gimhae-si (KR)

(73) Assignee: HANJIN IND. CO., LTD., Yangsan-si (KR)

( * ) Notice: Subject to any disclaimer, the term of this patent is extended or adjusted under 35 U.S.C. 154(b) by 0 days.

(21) Appl. No.: 16/968,314

(22) PCT Filed: Aug. 28, 2018

(86) PCT No.: PCT/KR2018/009904
§ 371 (c)(1),
(2) Date: Aug. 7, 2020

(87) PCT Pub. No.: WO2019/182206
PCT Pub. Date: Sep. 26, 2019

(65) Prior Publication Data
US 2021/0010458 A1    Jan. 14, 2021

(30) Foreign Application Priority Data

Mar. 20, 2018 (KR) .......................... 10-2018-0032244

(51) Int. Cl.
*F03D 17/00* (2016.01)
*G05D 27/00* (2006.01)
(Continued)

(52) U.S. Cl.
CPC ............ *F03D 7/045* (2013.01); *F03D 7/0292* (2013.01); *F03D 7/048* (2013.01); *F03D 17/00* (2016.05);
(Continued)

(58) Field of Classification Search
CPC .......... F03D 7/045; F03D 17/00; F03D 7/048; F03D 7/0292; G05D 11/00; G05D 27/00; F05B 2270/1033; F05B 2270/332
(Continued)

(56) References Cited

U.S. PATENT DOCUMENTS

2010/0219634 A1   9/2010  Arlaban et al.
2013/0038060 A1*  2/2013  Odgaard ................. F03D 9/257
                                                              290/44
2019/0226456 A1*  7/2019  Korfein ................. G05B 15/02

FOREIGN PATENT DOCUMENTS

JP    2013-170507 A    9/2013
JP    2015-129508 A    7/2015
(Continued)

*Primary Examiner* — Michael J Brown
(74) *Attorney, Agent, or Firm* — Novick, Kim & Lee, PLLC; Jae Yours Kim

(57) ABSTRACT

A multi-class controller for a wind power generator capable of controlling the operation of the wind power generator in an optimal state under various site conditions and a wind power generation system using same are proposed. The multi-class controller includes: a sensor unit for sensing the environmental conditions of an area where the wind power generator or the power transmission unit to be controlled is installed and a state of a component constituting an object to be controlled, and generating a sensing value; and a control unit for receiving the sensing value to determine an operation state of the object to be controlled, converting a predetermined control default value for controlling the object to be controlled to a control value.

4 Claims, 3 Drawing Sheets

(51) Int. Cl.
*G05D 11/00* (2006.01)
*F03D 7/04* (2006.01)
*F03D 7/02* (2006.01)

(52) U.S. Cl.
CPC ............. *G05D 11/00* (2013.01); *G05D 27/00* (2013.01); *F05B 2270/1033* (2013.01); *F05B 2270/332* (2013.01)

(58) Field of Classification Search
USPC ........................................................ 700/286
See application file for complete search history.

(56) References Cited

FOREIGN PATENT DOCUMENTS

| | | |
|---|---|---|
| KR | 10-1453715 B1 | 11/2014 |
| KR | 10-2015-0024893 A | 3/2015 |
| KR | 10-2016-0012033 A | 2/2016 |
| KR | 10-1606139 B1 | 3/2016 |

\* cited by examiner

MULTI-CLASS CONTROLLER FOR WIND POWER GENERATOR AND WIND POWER GENERATION SYSTEM USING SAME

TECHNICAL FIELD

The present invention relates to a multi-class controller for a wind power generator and a wind power generation system using the same, and more particularly, to a multi-class controller for a wind power generator, capable of controlling the operation of the wind power generator such that the wind power generator can operate in an optimal state under various site conditions and a wind power generation system using the same.

BACKGROUND ART

Among new and renewable energy, wind power generation is one of power generation schemes affected by various factors, especially by the environment. The factors that affect the wind power generation include wind speed, which is the most important factor, duration, wind direction, and variation ranges thereof. In addition, when compared to other power generations, the wind power generation is more affected by various environmental factors such as occurrence of gusts, humidity, salinity, and temperature. Due to the above characteristics, the control conditions are significantly changed not only by the locational conditions, but also the environment that varies during power generation, and the amount of power generation is changed.

The wind power generation has many factors to be considered, so in general, a site that shows the most constant environmental conditions, for example, a place where economical wind blows in a certain direction is selected and a power generation facility is constructed in the selected site.

However, environmental conditions may be changed hourly, daily, and seasonally, so management to control the pitch, yaw, and output of a generator in response to the changes may be required. Therefore, when compared to other power generation methods, complexity of a controller that controls the generator is increased and high performance is required.

For these reasons, the conventional wind power generation scheme may only be operated in limited places. Moreover, since the locational conditions are different, a single type of generators cannot be used, so various types of generators have to be developed. In this case, however, since the development and verification of the controller for each generator has to be performed simultaneously, there is a great limitation in the development and operation of the generator.

In addition, due to high complexity and environmental burden, the conventional wind power generation scheme requires a high level of development capability and maintenance capability for maintenance and optimal power generation, causing a difficulty in increasing the utilization rate of the wind power generation.

PATENT DOCUMENTS

Korean Registered Patent No. 10-1453715 (Registration Date: Jan. 1, 2014)

DISCLOSURE

Technical Problem

Accordingly, an object of the present invention is to provide a multi-class controller for a wind power generator, capable of controlling the operation of the wind power generator such that the wind power generator can operate in an optimal state under various site conditions, and a wind power generation system using the same.

In addition, another object of the present invention is to provide a multi-class controller for a wind power generator and a wind power generation system using the same, which can be operated, maintained, and managed with a minimum number of workers and can be controlled in an optical state.

Further, still another object of the present invention is to provide a multi-class controller for a wind power generator and a wind power generation system using the same, which can be universally applicable to various scales and classes, so that there is no need to develop a controller dedicated for each scale and each class, thereby minimizing the effort, cost, and time required for constructing a power generation facility.

Technical Solution

In order to accomplish the above object, the present invention provides a multi-class controller that controls a wind power generator and a power transmission unit that supplies power generated by the wind power generator to a predetermined target, the multi-class controller including: a sensor unit configured to sense environmental conditions of an area where the wind power generator or the power transmission unit, which is a control target, is installed and a state of components constituting the control target, and generate a sensing value; and a control unit configured to receive the sensing value to determine an operation state of the control target, convert a predetermined control default value for controlling the control target to a control value by applying a predetermined adjustment value according to the operation state, adjust the control value so as to maximize an amount of power generation or reduce a load applied to the component aged over a reference value by determining aging of the component, and search for an adjustment value for generating the control value.

In addition, the present invention provides a wind power generation system including: one or more power generators; a power transmission unit configured to supply power generated by the wind power generator to a predetermined target; and a multi-class controller configured to sense environmental conditions of an area where the wind power generator or the power transmission unit, which is a control target, is installed and a state of components constituting the control target, generate a sensing value, determine an operation state of the control target by using the sensing value, convert a predetermined control default value for controlling the control target to a control value by applying a predetermined adjustment value according to the operation state, adjust the control value so as to maximize an amount of power generation or reduce a load applied to the component aged over a reference value by determining aging of the component, and search for an adjustment value for generating the control value, wherein the multi-class controller performs a test by adjusting the control value to determine the adjustment value.

Advantageous Effects

The multi-class controller for a wind power generator and the wind power generation system using the same according to the present invention can control the operation of the wind power generator such that the wind power generator can operate in an optimal state under various site conditions.

In addition, the multi-class controller for a wind power generator and the wind power generation system using the same according to the present invention can be operated, maintained, and managed with a minimum number of workers and can be controlled in an optical state.

Further, the multi-class controller for a wind power generator and the wind power generation system using the same according to the present invention can be universally applicable to various scales and classes, so that there is no need to develop a controller dedicated for each scale and each class, thereby minimizing the effort, cost, and time required for constructing a power generation facility.

BEST MODE

Mode for Invention

Figure 1:
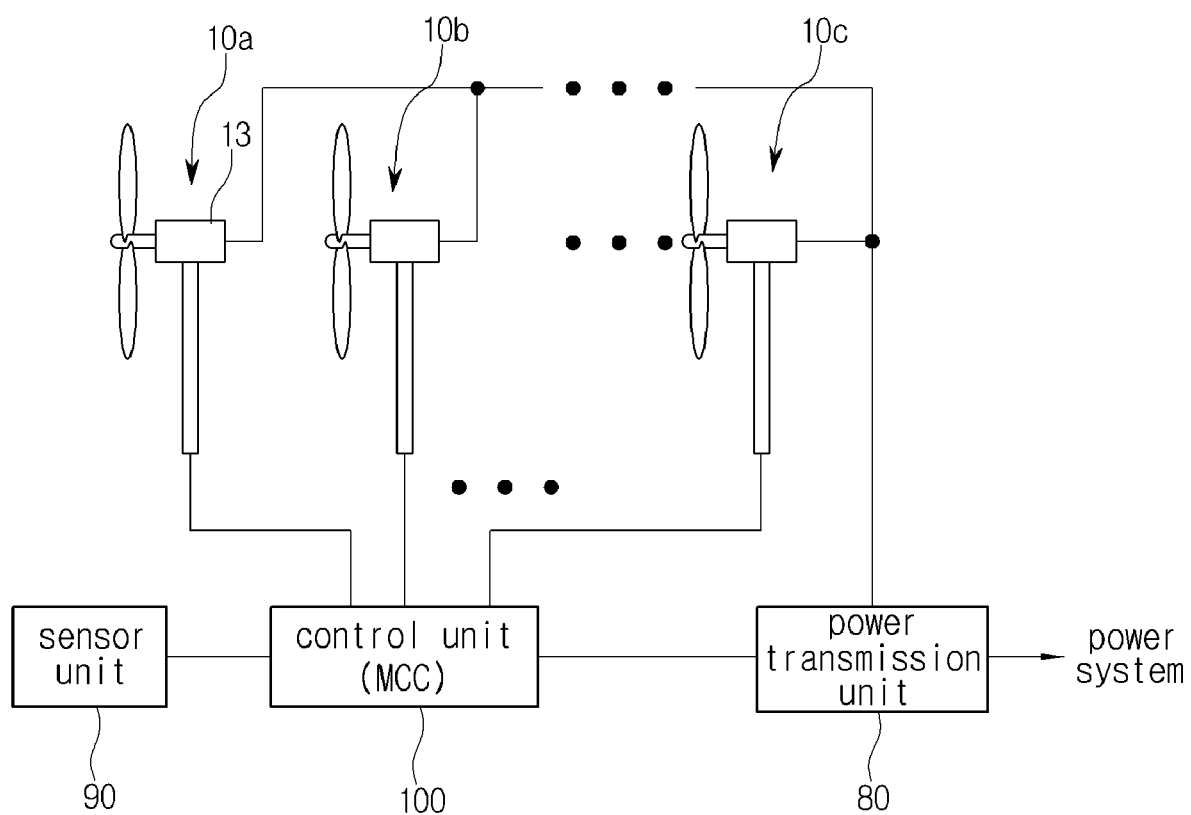
FIG. 1 is a view schematically showing the configuration of a wind power generation system equipped with a multi-class controller of the present invention.

Hereinafter, embodiments of the present invention will be described with reference to the accompanying drawings so that those skilled in the art can easily implement the embodiments. It should be noted that, in the accompanying drawings, the same reference numerals are used to designate the same configurations throughout the drawings. In addition, in the description of the present invention, when it is determined that a detailed description of a known function or known configuration may unnecessarily obscure the subject matter of the present invention, the detailed description thereof will be omitted. Further, some features presented in the drawings may be enlarged, reduced or simplified to facilitate the explanation, and the drawings and components thereof may not be necessarily drawn to scale. However, those skilled in the art may readily understand these details.

FIG. 1 is a view schematically showing the configuration of a wind power generation system equipped with a multi-class controller of the present invention.

Referring to FIG. 1, a wind power generation system equipped with a multi-class controller according to the present invention may include a wind power generator 10, a power transmission unit 80, a sensor unit 90, and a control unit 100.

The wind power generator 10 (10a, 10b and 10c) may be operated under the control of the control unit 100 and generate power to transfer the power to the power transmission unit 80. The wind power generator 10 may include a cell 13 consisting of devices such as a blade, a hub, a rotor, a gearbox, a generator, and a safety device, and may have a control device such as an actuator for controlling the drive of the blade, the gearbox, and the safety device. In addition, a plurality of sensors for detecting the state of the wind power generator 10 such as the state and operation of the blade, the state of the gearbox, and the operation of the safety device may be provided, and the sensors may be included in the sensor unit 90. The wind power generator 10 may be operated or turned off according to the control signal of the control unit 100, and the operation state may be changed to change the output power. To this end, the control device provided in the wind power generator 10 may receive control commands of the control unit 10 to change the state of each device.

As shown in FIG. 1, the wind power generator 10 may include a plurality of wind power generators, and generally, the wind power generators may have the same power generation capacity and structure. However, the present invention may not be limited to the above. Only one wind power generator 10 may be provided or the wind power generators 10 having mutually different structures and power generation capacities may be provided. Meanwhile, the wind power generator 10 may be operated in combination with other renewable energy, for example, power generation devices such as solar power generation, geothermal power generation, tidal power generation, and wave power generation. In the present invention, the wind power generator will be described as an example for convenience of explanation.

The power transmission unit 80 may receive power generated from the wind power generator 10 and supply the power to an external system such as a power system and an energy storage device. To this end, the power transmission unit 80 may include an inverter or converter that converts AC power delivered from the wind power generator 10 into DC power, or boosts or decompresses the generated voltage. In addition, the power transmission unit 80 may include a disconnector, a circuit breaker, a voltmeter, and an ammeter to connect or disconnect the power system and the wind power generator 10. The power transmission unit 80 may also control the power conversion of the inverter or converter under the control of the control unit 100 to control the power supplied to the power system, and may transmit the operation state to the control unit 100.

The sensor unit 90 may measure various values of the environment where the wind power generator 10 operates and deliver the measured values to the control unit 100. In addition to the values directly related to the power generation, such as direction and speed of the wind, the sensor unit 90 may measure factors that directly or indirectly affect the durability and amount of power generation of the wind power generator 10, such as humidity, temperature, intensity of direct light, salinity, and dust concentration, and deliver the measured sensing values to the control unit 100. The sensor unit 90 may include sensor devices that generate mutually different interfaces and sensing values, and the sensing values may be interfaced through the control unit 100 for use or delivery. In addition, the sensor unit 90 may be configured as a remote monitoring control device such as Supervisory Control And Data Acquisition (SCADA), or may include the remote monitoring control device, and may receive data corresponding to the sensing data through a separate external service (for example, the Meteorological Administration).

The control unit 100 may generate control commands for the operation of the wind power generator 10 and control commands for the operation of the power transmission unit 80 and may transmit the control commands to the wind power generator 10 and the power transmission unit 80. In addition, the control unit 100 may use the sensing value transmitted from the sensor unit 90 to generate and transmit the control commands. To this end, the control unit 100 may include a main control unit, a self-optimizing unit, and a component life management unit. The above configurations will be described below in more detail with reference to FIG. 2.

The control unit 100 may generate a control value by converting a control default value, which is predetermined according to each wind power generator 10, environmental components in a region where the wind power generator 10 is installed, and characteristics of components constituting the wind power generator 10, according to the sensing value and preset data, and transmit the generated control value to the wind power generator 10 or the power transmission unit 80 to control the wind power generation.

More specifically, the control unit 100 may store information on the environment of the region where the wind power generator 10 is operated and control information that is a standard when operating in the environment. The control information may include the control default value for operating the wind power generator 10 such as information related to output control methods including pitch control or stall control, information related to operation methods including constant speed operation or variable speed operation, and information related to normal turbine operation control, malfunction monitoring, load control, and filter and sensor data processing. In addition, the control information may include the type of the wind power generator 10, for example, information related to the structure such as whether it is a horizontal-axis type or a vertical-axis type.

In particular, the control information may include adjustment information that enables the control default value to be adjusted according to the factor that varies such as sensing data or life prediction value. In addition, the control information may further include component characteristic information such as processing procedures of the control unit for leveling and maintenance of consumable parts of the wind power generator 10 or parts requiring maintenance due to aging, and parts related to the amount of power generation upon power generation for predicting the component life. When a plurality of wind power generators 10 are provided as shown in FIG. 1, the control information may include individual information that needs to be applied to each wind power generator 10 and integral information that can be applied to the entire wind power generators 10.

The control unit 10 may transmit the control value for controlling the wind power generator 10 to the wind power generator 10 or the power transmission unit 80 through the control information to operate the wind power generation system.

Figure 2:
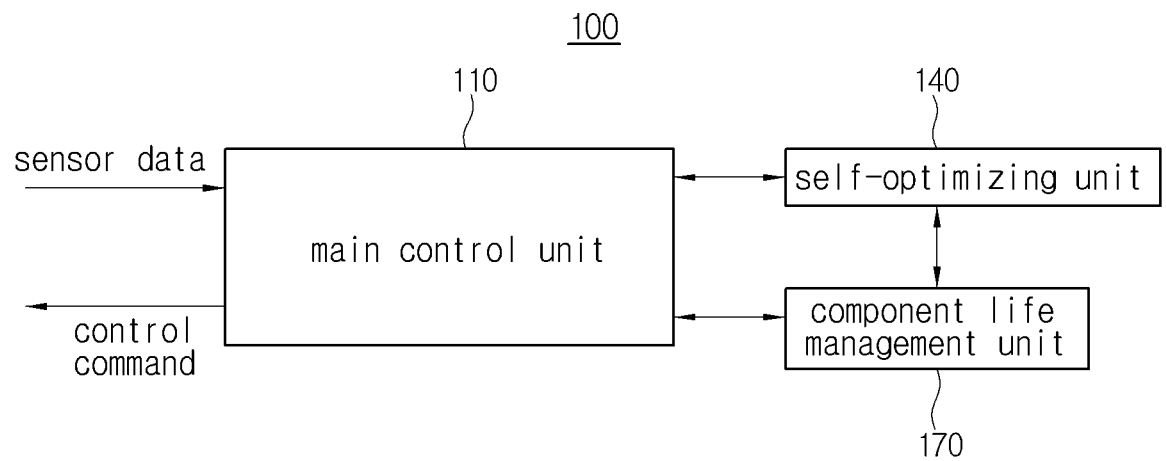
FIG. 2 is a view showing in more detail the configuration of a control unit according to the present invention.

FIG. 2 is a view showing in more detail the configuration of the control unit according to the present invention.

Referring to FIG. 2, the control unit 100 of the multi-class controller according to the present invention may include a main control unit 110, a self-optimizing unit 140 and a component life management unit 170.

The main control unit 110 may generate and transmit the control value for the wind power generator 10 and the power transmission unit 80 and receive the sensing value from the sensor unit 90 to generate the control value by using the sensing value or transmit the sensing value to the self-optimizing unit 140 or the component life management unit 170.

In detail, the main control unit 110 may serve as an interface for receiving data, such as the sensing value, from an external device, such as the sensor unit 90, and may receive data, in particular, the sensing value, to generate the control value by using the sensing value. The data is for controlling the wind power generation system including the wind power generator 10 and the power transmission unit 80, and may be data transmitted from a separate service system such as the Meteorological Administration or data transmitted from another system at a remote location.

The main control unit 110 may generate the control value by applying the sensing value, the adjustment value transmitted from the self-optimizing unit 140, and the life value for life management transmitted from the component life management unit 170 to the control default value included in the control information and transmit the control value to the wind power generator 10 and the power transmission unit 80. For example, when current wind speed information is transmitted as a sensing value, the main control unit 10 may transmit the sensing value to the self-optimizing unit. In addition, the main control unit may check the control default value for controlling the pitch at the current wind speed through the control information. In this case, when the adjustment value or the life value is transmitted from the self-optimizing unit 140 or the component life management unit 170, the main control unit 110 may adjust the control default value corresponding to the adjustment value or the life value to calculate the control value.

That is, if the pitch value for optimum power generation at the current wind speed is determined as A° in the control default value, the "A° " value may become the control default value, and the adjustment value or life value may be an angle value for adjusting the control default value. That is, the main control unit 110 may calculate and transmit the A2° value as the control value to convert A° to A2° by using the adjustment value or the life value. It is obvious that the adjustment value or the life value may vary depending on the component of the control target. For example, in the case of the pitch and yaw, it may be an angular value and a deviation value therefor. If it is a value for driving an actuator, it may be a pressure value or a value representing the number of revolutions or speed of a motor. In the case of the inverter, it may be defined as a value such as a switching frequency. Although the specific form and type of each control value are not described in the present invention, it is obvious that the adjustment value and the life value may be provided in the form of values or conditions for adjusting the control default value.

Although it is described that the main control unit 110 receives the adjustment value and life value from the self-optimizing unit 140 and the component life management unit 170, respectively, to calculate the control value, the self-optimizing unit 140 may receive the life value of the component life management unit 170 to calculate the control value such that only the adjustment value can be finally transmitted to the main control unit 110, or on the contrary, the life value reflecting the adjustment value can be transmitted to the main control unit 110 to calculate the control value, but the present invention is not limited to the above. In particular, the control value can be stored after being calculated once and used repeatedly as long as the adjustment value or the life value is not changed.

Meanwhile, the main control unit 110 may serve as an interface for connecting the external system and the control unit 10. For example, the main control unit 110, the self-optimizing unit 140, and the component life management unit 170 have to receive data such as the sensing value from external devices, such as the sensor unit 90, or a separate service system. In this case, for the connection to various types of external devices or systems, various interfaces are required, so that the system complexity may be increased. Therefore, the connection to the external devices or system may be achieved by the main control unit 110, and the main control unit 110 may serve as a relay to transmit the data. To this end, the main control unit 110 may perform data exchange through the connection with a built-in communication unit or a communication device including a separate interface, and transmit the data to the self-optimizing unit 140 or the component life management unit 170, or receive the data from the self-optimizing unit 140 or the component life management unit 170 to transmit the data to the outside. In general, although the communication units may communicate using an Internet protocol, a communication scheme such as RS232 may be used, and a communication module for each communication scheme may be further provided.

The self-optimizing unit 140 may adjust the control default value to transmit the adjustment value for controlling the control value such that the control value optimized for the current operating environment and current equipment can be transmitted to the wind power generator 10 or the power transmission unit 80. In particular, the self-optimizing unit 140 may transmit the adjustment value to the main control unit 110 to allow the main control unit 110 to operate by converting the control default value according to a predetermined procedure, so that the corresponding device in the current operating environment, that is, the wind power generator 10 or the power transmission unit 80 may be adjusted to produce the maximum power.

More specifically, the control information may be transmitted with the control value calculated by experiments performed in advance for each wind power generator 10 or the power transmission unit 80. However, in the site, the operating environment may vary depending on factors such as temperature, humidity, salinity, or dust, and accordingly, a situation in which optimum power generation cannot be performed based on the control default may occur. Even if the generators are manufactured with the same specification, the generators may have mutually different characteristics. For this reason, even if the same control value is transmitted, the same power generation may not be achieved. Therefore, the self-optimizing unit 140 may calculate the adjustment value by adjusting the control value according to the site situation and the elapse of the operating time in consideration of the equipment characteristics and environmental characteristics.

In this process, the self-optimizing unit 140 may determine the adjustment value by reflecting the life value transmitted from the component life management unit 170, but the present invention is not limited thereto. The method of finding the optimization value by the self-optimizing unit 140 will be described below in more detail with reference to other drawings.

The component life management unit 170 may determine the consumption of each component by using the life information, which is included in the control information, of each component constituting the wind power generator 10 or the power transmission unit 80. In addition, the component life management unit 170 may allow the main control unit 110 to calculate the control value in consideration of the consumption determination result or to inform the state of the component to the outside. The control unit 10 may be provided therein with a communication unit for communication with the outside, or may be connected to a separate communication unit to perform communication with a system designated by an administrator, which can be understood within a known technical scope, so the detailed description thereof will be omitted in the present invention.

The component life management unit 170 may predict the life of each component by reflecting the sensing value obtained in the site to the life information determined by the experiment, so the management for each component can be achieved in the actual usage environment through the prediction of each component. In addition, the component life management unit 170 may check the consumption rate over time to calculate the life value, and transmit the life value to the main control unit 110 or the self-optimizing unit 140 so that the control value reflecting the decrease in efficiency due to the consumption can be calculated.

Figure 3:
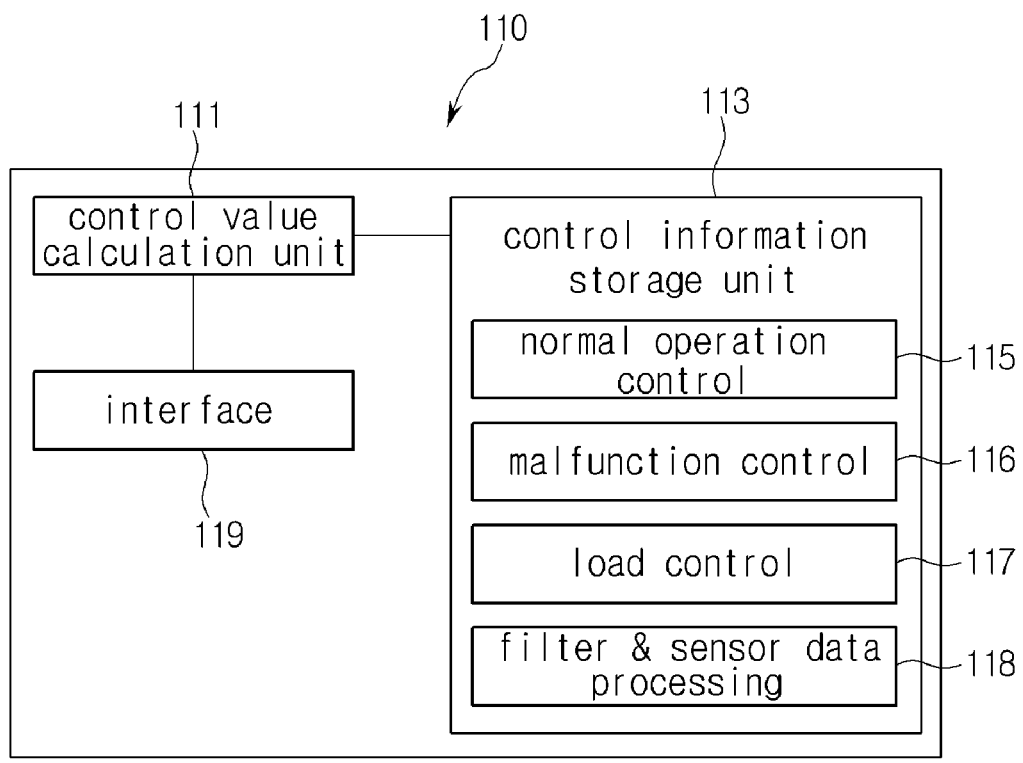
FIG. 3 is a block diagram showing the configuration of a multi-class controller according to the present invention.

FIG. 3 is a block diagram showing the configuration of the multi-class controller according to the present invention.

Referring to FIG. 3, as described above, when the sensing value for the current state is transmitted to the main control unit 110, the main control unit 110 may calculate the control value by reflecting the adjustment value and the life value, which are transmitted from the self-optimizing unit 140 and the component life management unit 170, respectively, to the control default value corresponding to the current state. In addition, the main control unit 110 may perform the control operation by transferring the calculated control value to the control target (wind power generator 10 or power transmission unit 80). To this end, the main control unit 110 may maintain and manage various types of information for performing functions.

In detail, the main control unit 110 may include a control value calculation unit 111, a control information storage unit 113, and an interface 119, in which the control information storage unit 113 may be divided into a normal operation control area 115, a malfunction control area 116, a load control area 117, and a filter & sensor data processing area 118. The main control unit 110 is suggested as an example to explain the function of the main control unit 110 and the present invention is not limited thereto.

The control value calculation unit 111 may calculate the control default value applied to the current state based on the control information stored in the control information storage unit 113, and calculate the control value by applying the adjustment value and the life value to the control default value. Further, the control value calculation unit 111 may transmit the calculated control value to the control target. In this case, the control value calculation unit 111 may determine whether the control target is in a normal operating state, a malfunctioning state, or a state in which separate control such as load control is required based on the control information of the control information storage unit 113 by using the sensing value to calculate the appropriate control value. In addition, the control value calculation unit 111 may calculate the control value according to the determined state, and transmit the control value to the control target.

The control information storage unit 113 may record various types of data and data processing methods for controlling the control target, and transmit the stored data to the control value calculation unit 111, the self-optimizing unit 140, and the component life management unit 170 in response to the request of the control value calculation unit 111. The self-optimizing unit 140 and the component life management unit 170 may individually maintain separate control information in separate areas, however, in the present invention, it is assumed that they are included in the main control unit 110 for convenience of explanation. To this end, as shown in FIG. 3, the control information storage unit 113 may include the normal operation control area 115, the malfunction control area 116, the load control area 117, and the filter & sensor data processing area 118. In addition, an information area may be added or changed as necessary.

The normal operation control area 115 may store information related to data and procedures required to calculate the control value for direct control, such as parking of the wind power generator 10, normal operation start, idling, normal operation stop, pitch control information, power/torque control information, yaw control information, flicker control degree, and noise control information.

The malfunction control area 116 may store information related to pitch control failure, yaw control error, over-speed control of a rotor or generator, control failure for the power transmission unit, load limit control, power frequency control, and power amplification rate control.

The load control area 117 may store information such as output and speed control information, damping control information, feed forward control information, improved pitch control information, and rotor control information.

The filter & sensor data processing area 118 may store information related to devices, connection methods, and data processing for external devices and external systems connected through an interface.

The interface 119 may receive the sensing value from the sensor unit 90 and transmit the sensing value by converting the sensing value in a form suitable for the self-optimizing unit 140 or the component life management unit 170. Such a conversion may be performed only when the sensing value is not the data type required by the self-optimizing unit 140 and the component life management unit 170, and the conversion may be carried out based on the information stored in the filter & sensor data processing area 118 of the control information storage unit 113 and the converted sensing value may be transmitted.

Figure 4:
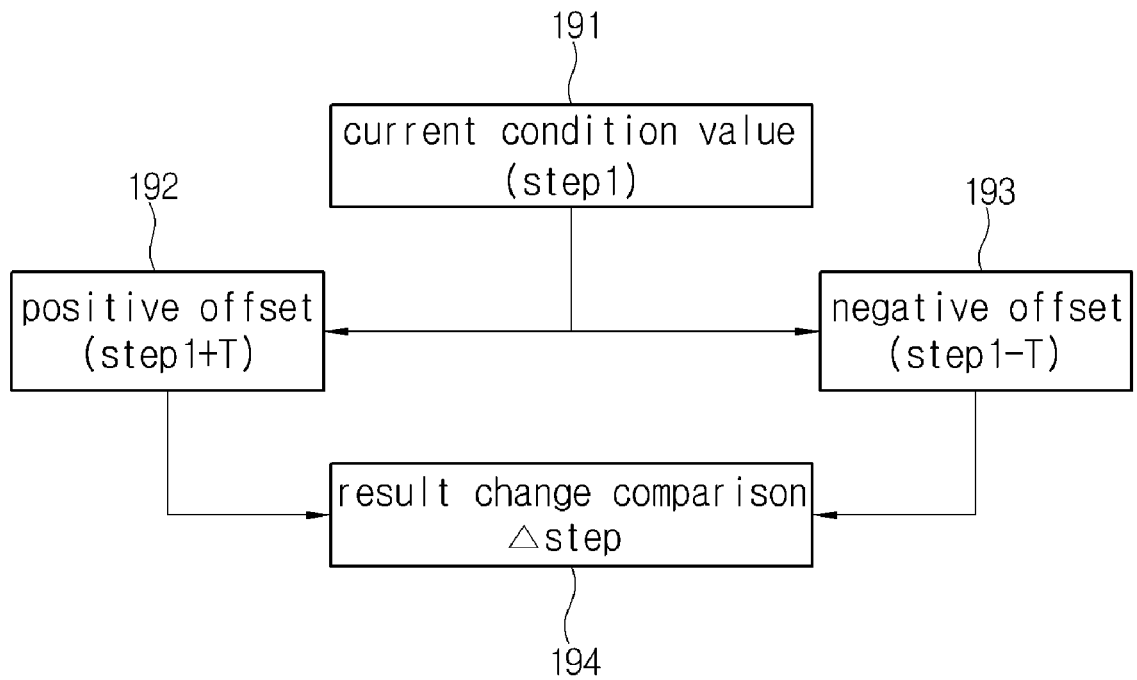
FIG. 4 is a view for explaining the self-optimizing process of a multi-class controller according to the present invention.

FIG. 4 is a view for explaining the self-optimizing process of the multi-class controller according to the present invention.

Referring to FIG. 4, as described above, the multi-class controller of the present invention may perform the operation control by not only using predetermined control information, but also estimating the optimum state in consideration of the site situation where the wind power generator 10 is installed, the state of the load, and the consumption over use time of the wind power generator 10 or power transmission unit 80.

To this end, as described above, the control unit 10 of the multi-class controller may include the self-optimizing unit 140 in addition to the control unit 110 that generates and transmits the control value, and the optimum operation may be achieved through the combination of the self-optimizing unit 140 and the control unit 110.

In detail, when the sensing value is transmitted, the control unit 110 may calculate an appropriate control value by reflecting the current state identified by the sensing value to the control default value recorded in the control information. In this case, the calculated control value may not be transmitted as it is, but the control value in which the control default value is adjusted by the adjustment value calculated by the self-optimizing unit 140 may be calculated, and the adjusted control value may be transmitted to the control target.

In order to calculate the adjustment value, the self-optimizing unit 140 may calculate the adjustment value according to the procedure as shown in FIG. 4. To this end, the self-optimizing unit 140 may randomly generate a deviation of the adjustment value, that is, a deviation operated by the control value to measure the result value. In addition, the self-optimizing unit 140 may compare the calculated result value with a result value generated by other deviations to calculate an optimal adjustment value. Further, in the process for calculating the deviation, that is, the optimized adjustment value, the self-optimizing unit 140 may transmit the adjustment value to which the random deviation is applied to the main control unit 110. Accordingly, the main control unit 110 may perform the control according to the transmitted adjustment value, and receive the execution result through the sensor unit 90 or the power transmission unit 80 to transmit the execution result to the self-optimizing unit 140.

In detail, the self-optimizing unit 140 may set a current condition value 191 (step 1) in which the control default value calculated by the main control unit 110 serves as a reference value. Then, the self-optimizing unit 140 may set the operation deviation based on the current condition value 191 (step 1). In this case, the self-optimizing unit 140 may randomly set the deviation size T and the direction (+, −).

For example, the self-optimizing unit 140 may determine a positive offset 192 in which a deviation (+T) of an arbitrary size is set in the direction of increasing the current condition value. That is, in the case of a control value for adjusting the angle of the pitch, an adjustment value for changing the control value in the direction of increasing the angle of the pitch may be calculated. When the adjustment value based on the positive offset 192 is transmitted, the main control unit 110 may transmit the control value to the pitch adjustment unit (for example, an actuator or a motor) so that the pitch can be controlled according to the adjustment value. In addition, the main control unit 110 may receive the sensing value from the sensor unit 80 until the time for checking the result has elapsed and transmit the sensing value to the self-optimizing unit 140.

Similarly, the self-optimizing unit 140 may determine the negative offset 193 in which a deviation (−T) of an arbitrary size is set in the direction of reducing the condition value, and obtain the result value through the above-described process.

The condition value that serves as a reference for increasing or decreasing the size of the deviation may be an initial control default value, but may also be a condition value calculated immediately before, that is, an offset.

When the result is obtained by various deviations, the self-optimizing unit 140 may obtain a better result by comparing the obtained results, for example, in the case of pitch adjustment, a deviation value 194 capable of obtaining a result such as a decrease of load and an increase of power generation may be selected.

In this case, the selected deviation value may be applied directly to the adjustment value and transmitted to the main control unit 110, but may be used as a value (offset) that considers the size of the deviation and the direction of the deviation to calculate other optimization values. Such a process may be periodically executed according to various conditions to calculate an adjustment value for optimization, for example, when the use time of a component reaches a predetermined time or when a change in wind direction occurs.

Figure 5:
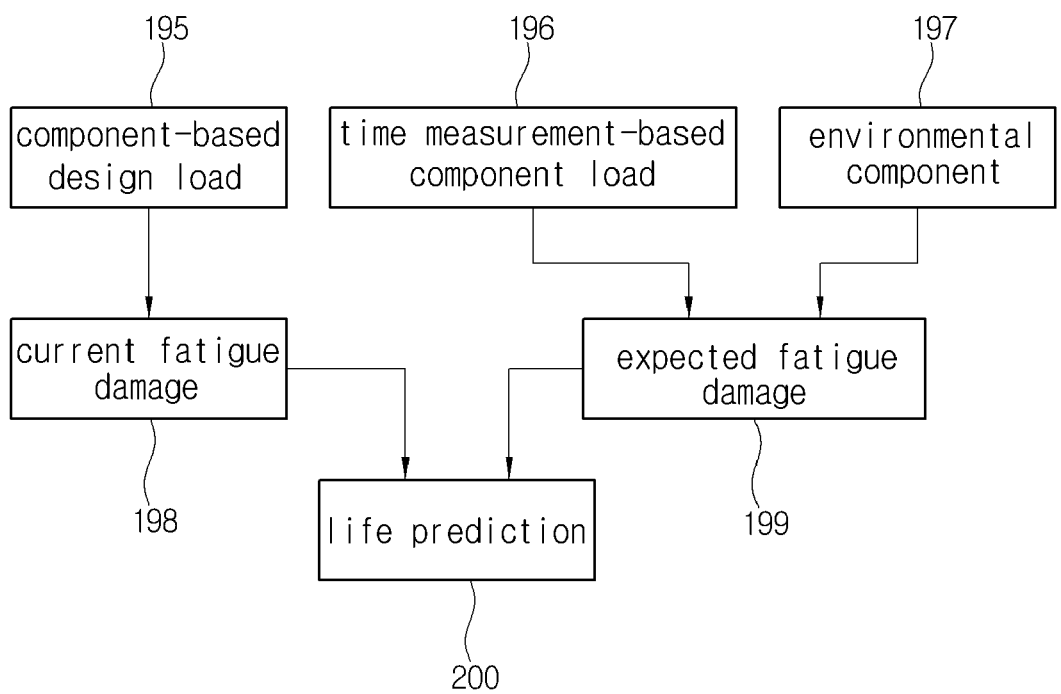
FIG. 5 is a view for explaining a process of managing a component life of a multi-class controller according to the present invention.

FIG. 5 is a view for explaining a process of managing a component life of the multi-class controller according to the present invention.

The component life management unit 170 may determine whether components constituting the wind power generation system, that is, each component of the wind power generation system is aged, and predict the lifespan based on the aging, or calculate efficiency reduction.

To this end, the component life management unit 170 may predict the lifespan according to the procedure as shown in FIG. 5 to request management to the administrator or reduce the control value in the direction of reducing the burden on the components, thereby allowing the components to be used for a longer period of time.

To this end, the component life management unit 170 may use component-based design load information 195 and time measurement-based component load information 196 included in the control information and an environmental component by the sensing value 197.

The component-based design load information 195 may be calculated under the conditions at the time of design or an experimental environment, and may refer to information related to aging in which environmental factors in a region where the control target is installed are not considered. The component-based design load information 195 may be included in the above-mentioned control information.

The time measurement-based component load information 196 may refer to information calculated by applying consumption and aging over time to the component-based load design information 195.

The environmental component 197 may refer to information that can be received from the sensor unit 90 or an external system, and may refer to environmental information of a region where the wind power generator 10 is installed, which may include an accumulated value or an average of the accumulated value in addition to an instantaneous measurement value.

The component life management unit 170 may calculate the component-based design load information 196, that is, a current fatigue damage 198 due to the load calculated at the time of design. In addition, the component life management unit 170 may calculate an expected fatigue damage 199 by applying an actual load, which is received while the wind power generator 10 is being driven, to aging according to the time measurement-based component load information 196.

Further, the current fatigue damage 198 may be compared with the expected fatigue damage 199 to determine how much more is consumed than the experimentally calculated state. Therefore, the difference between the lifespan expected by the component-based design load 195 and the actual life can be calculated so that the administrator can more accurately predict the actual lifespan.

In particular, the component life management unit 170 may perform the above process with respect to each component, that is, each part, so it is possible to find the component that is rapidly aging under a large load, and it can be utilized in a way to reduce the aging of the component. That is, the control for reducing the load to the component, which is rapidly consumed, may be carried out by transmitting a value for changing the control value to the main control unit 110 or the self-optimizing unit 140.

During the above process, the factors that may affect power generation within the constraints of various loads given by the self-optimizing unit 140 can be automatically corrected so that the wind power generation can be performed in an optimized state.

As described above, the multi-class controller of the present invention can control the wind power generator and the power transmission unit based on the environment in which the wind power generator and the power transmission unit are installed, thereby achieving the optimal power generation in a given environment.

In particular, according to the controller of the present invention, the control is not performed with the control value having a preset value, but performed by directly testing and adjusting the characteristics of the control target, thereby achieving the control that reflects the specific environment in which the control target is installed and the unique characteristics of the control target. In addition, the control can be performed in consideration of the lifespan of the components constituting the control target.

Moreover, since the controller of the present invention can reflect the unique characteristics of the control target, the controller can be universally applied to various types of control targets.

In particular, the controller of the present invention does not perform and calculate the control under the control of the user, but randomly perform the control according to predetermined conditions so that optimal operation can be achieved without separate labor force for performing the control.

Although embodiments of the present invention have been shown and described to illustrate the technical concept of the present invention, the present invention is not limited to the same configuration and operation as the embodiments described above, and various modifications can be made and implemented within the scope of the present invention. Therefore, such modifications should also be regarded as belonging to the scope of the present invention, and the scope of the present invention should be determined by the attached claims.

The invention claimed is:

1. A multi-class controller that controls a wind power generator and a power transmission unit that supplies power generated by the wind power generator to a predetermined target, the multi-class controller comprising:
   a sensor unit configured to sense environmental conditions of an area where the wind power generator or the power transmission unit, which is a control target, is installed and a state of components constituting the control target, and generate a sensing value; and
   a control unit configured to receive the sensing value to determine an operation state of the control target, convert a predetermined control default value for controlling the control target to a control value by applying a predetermined adjustment value according to the operation state, adjust the control value so as to maximize an amount of power generation or reduce a load applied to the component aged over a reference value by determining aging of the component, and search for an adjustment value for generating the control value; and
   wherein the control unit includes:
   a main control unit configured to receive the sensing value and output the control value to the control target; and
   a self-optimizing unit configured to receive the sensing value from the main control unit to calculate the adjustment value, or request a test for determining the adjustment value to the main control unit, and
   wherein the self-optimizing unit determines the adjustment value by calculating the adjustment value while randomly setting a size or direction of an adjustment deviation of the adjustment value, collecting results obtained by using the control value to which the calculated adjustment value is applied, and comparing the results.

2. The multi-class controller of claim 1, wherein the control unit further includes a component life management unit configured to predict a life of the component, and the component life management unit calculates the life of the component by comparing a fatigue life, which is obtained by calculating a predetermined load to the control target, with an expected fatigue damage which is obtained by applying an actual load measured based on the sensing value to load information of the control target that is predicted over time.

3. The multi-class controller of claim 2, wherein the component life management unit is configured to determine aged components according to life information calculated for the component, calculate a life value for adjusting the control value so that the load applied to the component is reduced, and transfer the life value to the main control unit.

4. A wind power generation system comprising:
one or more power generators;
a power transmission unit configured to supply power generated by the wind power generator to a predetermined target; and
a multi-class controller configured to sense environmental conditions of an area where the wind power generator or the power transmission unit, which is a control target, is installed and a state of components constituting the control target, generate a sensing value, determine an operation state of the control target by using the sensing value, convert a predetermined control default value for controlling the control target to a control value by applying a predetermined adjustment value according to the operation state, adjust the control value so as to maximize an amount of power generation or reduce a load applied to the component aged over a reference value by determining aging of the component, and search for an adjustment value for generating the control value,
wherein the multi-class controller performs a test by adjusting the control value to determine the adjustment value.

* * * * *